March 13, 1956
J. E. DOOLEY
2,737,867
PLOW LEVELING MECHANISM
Filed May 23, 1952
2 Sheets-Sheet 1
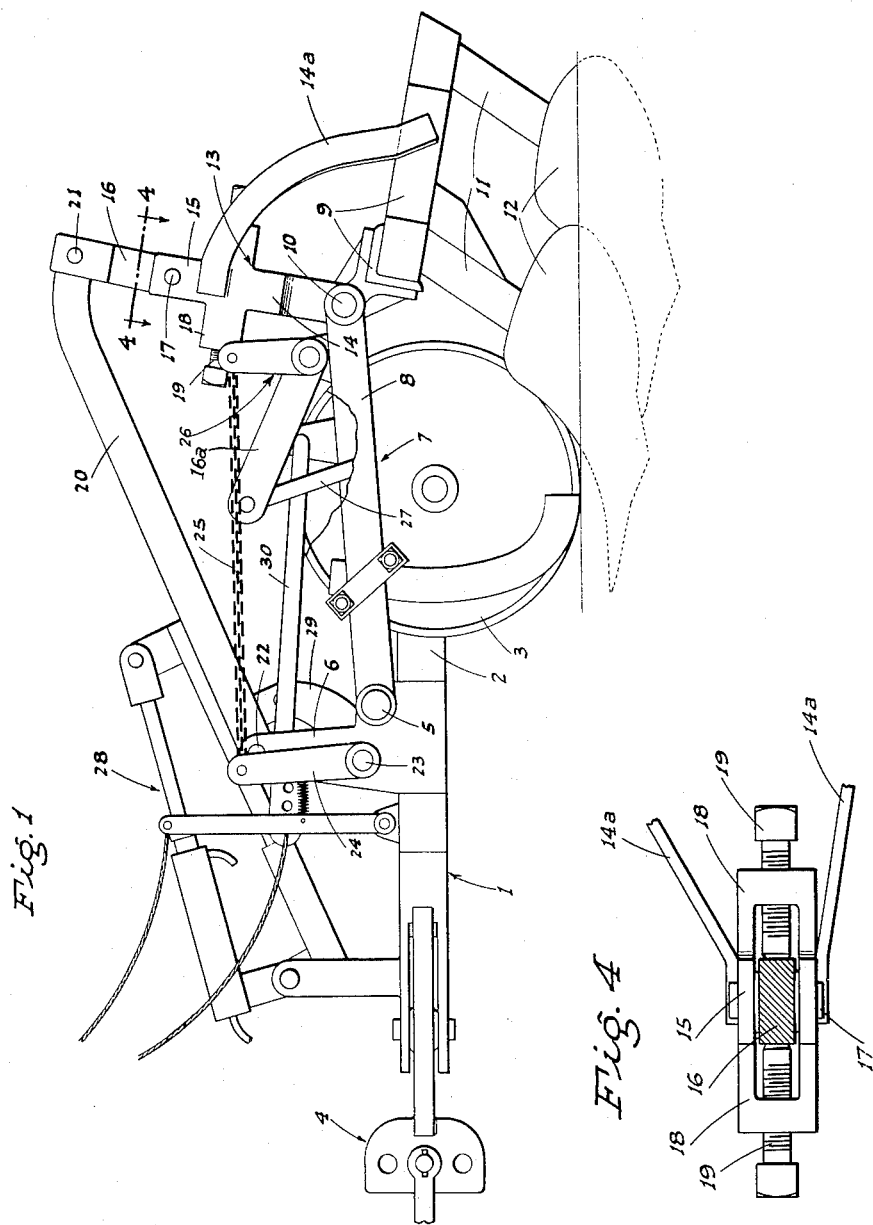
INVENTOR.
J. E. Dooley
BY
ATTORNEYS March 13, 1956 J. E. DOOLEY 2,737,867
PLOW LEVELING MECHANISM
Filed May 23, 1952 2 Sheets-Sheet 2
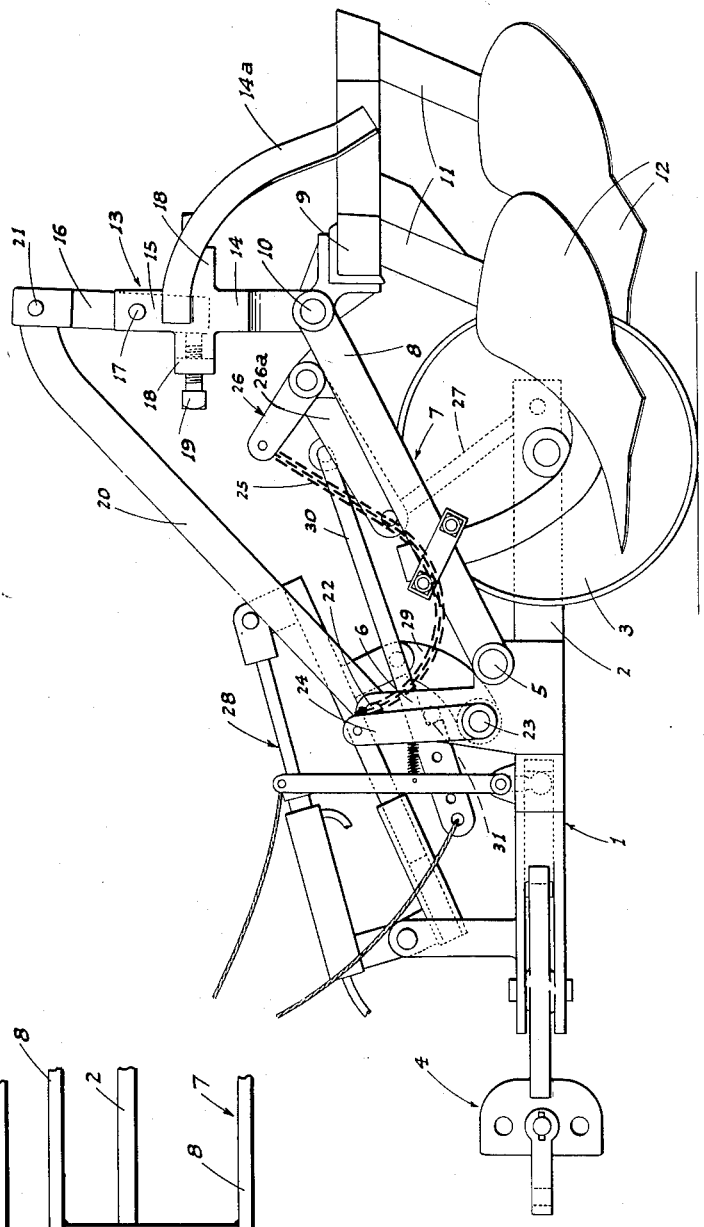
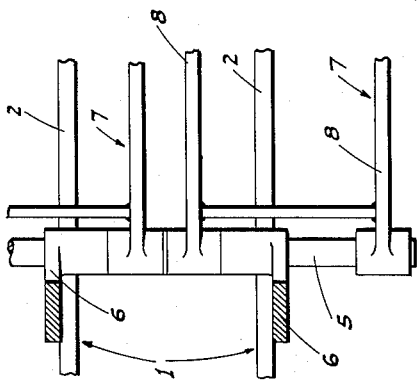
INVENTOR.
J. E. Dooley
BY
ATTORNEYS

United States Patent Office 2,737,867
Patented Mar. 13, 1956

2,737,867

PLOW LEVELING MECHANISM

James E. Dooley, Tulare, Calif.

Application May 23, 1952, Serial No. 289,593

3 Claims. (Cl. 97—46.27)

This invention relates to plows of the moldboard type; the present application being a continuation in part of my application Serial No. 791,871, filed December 15, 1947, and now Patent No. 2,619,016, dated Nov. 25, 1952, on Plow.

The principal object of this invention is to provide, in connection with a fixed-level wheel-supported frame, a swing frame mounted on the main frame for vertical movement and to which the plow shares are connected, and control means to raise and lower the swing frame; to correspondingly raise and lower the plow shares; a means associated with said level control means, which enables the angle of the plow shares relative to the ground to be altered without affecting the action of said control means.

A further object of the invention is to provide a practical and reliable plow leveling mechanism, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the plow as in use.

Fig. 2 is a similar view, but showing the swing frame and plow unit raised.

Fig. 3 is a fragmentary plan view showing the mounting of the swing frame in connection with the main frame.

Fig. 4 is a fragmentary enlarged cross section on line 4—4 of Fig. 1.

Referring now more particularly to the characters of reference on the drawings, the implement comprises a longitudinal main frame 1 which includes transversely spaced rearwardly projecting beams 2 each of which is fitted with a ground engaging wheel 3 by which the implement is supported at the rear; the front end of the main frame being provided with a hitch 4 adapted for supported draft engagement with a tractor.

Ahead of the wheels, a transverse shaft 5 is supported on transversely spaced brackets 6 upstanding from the frame; rearwardly projecting swing frames 7 being separately pivoted at their forward end on shaft 5 for independent swinging movement between raised and lowered positions and each swing frame including a pair of transversely spaced arms 8 which straddle the adjacent frame beam 2 and project beyond the same to the rear.

Projecting rearwardly from each swing frame is a tool bar unit 9 pivoted at its forward end in connection with the rear end of the swing frame by a transverse shaft 10. A pair of standards 11 depend in longitudinally and laterally spaced relation from the tool bar; plow shares 12 being mounted on the lower end of the standards.

In order to maintain the plow shares substantially level with any raising and lowering of each swing frame, the following arrangement is provided. Upstanding from tool bar 9, preferably at its forward end, is an arm unit or post 13 of special construction. Said arm unit comprises a lower section 14 held rigid with the tool bar by diagonal braces 14a and having an upwardly facing fork 15 at its upper end, and an upper section 16 projecting into the fork and pivoted there transversely of the structure as at 17. Fork 15 is provided below pivot 17 with front and rear yokes 18 in which set screws 19 are mounted, and which engage the front and rear edges of the section 16. A tie bar 20 is pivoted at its rear end on the upper end of section 16 as at 21 and at its forward end on one bracket 6 some distance above shaft 5 as at 22.

The length of tie bar 20 is such that with raising of each swing frame 7 from a lowered position with the plow shares 12 in the ground as in Fig. 1, to a raised position with said shares clear of the ground and inoperative as in Fig. 2, there is a relative swinging of the tool bar 9 which accomplishes a compensating action to maintain the shares generally level. By reason of the adjustable set screws 19, the alinement of the sectional arm unit 13 may be altered to correspondingly alter the setting of the tool bar, and of the plow shares, relative to horizontal, at any set position of the related swing frame.

Suitable mechanism is employed to raise and lower each swing frame, as shown in said patent. This mechanism consists generally of a cross shaft 23 journaled in brackets 6 and on which an upstanding arm 24 is mounted.

Said arm is connected by a chain 25 or the like to the upstanding arm of a bellcrank 26 pivoted on swing frame 7. The forwardly facing longitudinal leg 26a of the bellcrank is connected to the beam 2 below by a thrust link 27. When the shaft 23 is rotated therefore, to pull or slack up on the chain 25, a raising or lowering movement is imparted to the swing frame and to the plows. The shaft is thus rotated by means of a longitudinally extensible and contractible hydraulic unit indicated generally at 28 and anchored to the frame, and operatively connected to an arm 29 projecting from the shaft 23. The specific construction and arrangement of parts employed to connect the hydraulic unit 28 to arm 29 is the same as that shown and fully described in my Patent No. 2,619,016 before mentioned. The swing frame is releasably latched in a fully raised position for transportation by a latch bar 30 connected at its rear end to the swing frame 7 and engageable with a pin 31 fixed in connection with bracket 6 above shaft 5. This swing-frame raising and lowering mechanism is fully shown and described in the aforementioned patent, and of itself forms no part of the present invention.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A plow comprising a main substantially fixed-level frame, a swing frame, a pivot connecting the front end of the swing frame on the main frame, means between the main and swing frame to raise and lower the latter, a plow mounting tool bar projecting rearwardly from the swing frame, a pivot connection between the rear end of the swing frame and the tool bar, a sectional arm unit projecting upwardly from the tool bar, a tie bar pivoted on the main frame above the pivotal connection of the swing frame therewith and extending thence to a pivotal connection with the sectional arm unit at its upper end; said unit comprising upper and lower members, the latter being rigid with the tool bar, means pivoting the members together, and means between the members to turn one member on its pivot relative to the other member and maintain them in rigidly adjusted relationship.

2. A plow comprising a main substantially fixed-level frame, a swing frame, a pivot connecting the front end of the swing frame on the main frame, means between the main and swing frame to raise and lower the latter, a plow mounting tool bar projecting rearwardly from the swing frame, a pivot connection between the rear end of the swing frame and the tool bar, a sectional arm unit projecting upwardly from the tool bar, a tie bar pivoted on the main frame above the pivotal connection of the swing frame therewith and extending thence to a pivotal connection with the sectional arm unit at its upper end; said unit comprising upper and lower members, the latter being rigid with the tool bar, means pivoting the members together, said member being arranged in overlapping relation to each other, and opposed set screws mounted in one member beyond the pivot in position to engage the opposed edges of the overlapping portion of the other member whereby to enable the members to be disposed in angular relation to each other while maintaining them in rigidly adjusted relationship.

3. A structure, as in claim 1, in which the arm members overlap beyond the pivot, and said last named means comprises an elongated yoke unit extending transversely on one member in position to receive the overlapping portion of the other member in clearance relation to the opposed ends of the yoke unit, and opposed longitudinally adjustable set screws mounted in said yoke ends and engaging the side edges of the adjacent portion of said other member.

References Cited in the file of this patent

UNITED STATES PATENTS

| | | |
|---|---|---|
| 31,563 | Seibert | Feb. 26, 1861 |
| 2,330,283 | Hipple | Sept. 28, 1943 |
| 2,440,550 | Martin | Apr. 27, 1948 |
| 2,587,763 | Rimple | Mar. 4, 1952 |
| 2,619,016 | Dooley | Nov. 25, 1952 |
| 2,649,721 | Spedding | Aug. 25, 1953 |